United States Patent Office 2,762,776
Patented Sept. 11, 1956

2,762,776

FERROSPINEL BODIES AND METHODS OF MAKING SAME

Robert E. Hurley, Moorestown, and John O. Simpkiss, Jr., Palmyra, N. J., assignors to Radio Corporation of America, a corporation of Delaware No Drawing. Application October 5, 1953, Serial No. 384,337

11 Claims. (Cl. 252—62.5)

This invention relates to improved ferrospinel compositions, also known as ferrites, and more particularly to improved methods of making green ferrospinel bodies.

Ferrospinel compositions comprise ferric oxide and one or more other metallic oxides. See, for example, U. S. Patent No. 2,565,861. They are characterized by a spinel crystal structure and generally have advantageous magnetic properties. In physical form and structure they closely resemble ceramic materials and are made by molding and heating processes similar to the processes utilized in making ceramics.

One method of making ferrospinel bodies comprises calcining selected metallic oxides, preferably intimately intermixed, at about 800° to 1000° C. The calcined oxides are ground together to form a uniform, thoroughly comminuted mass. A binder, generally consisting of a water emulsion of paraffin, is added to the ground, calcined oxides to facilitate molding. Without a binder it is difficult to mold the oxides into a shaped body having sufficient strength to withstand subsequent handling such as removal from the mold. Difficulty is also encountered in making pure ground oxides flow evenly into a mold.

A wax such as paraffin has previously been found advantageous for use as a binder, and is usually added to the oxide mass in a water suspension in order to assure uniform distribution of the wax throughout the mass. There is thus formed a thick slurry which is dried to make a mixture suitable for molding. The dried mass is cut into small pellets which are poured into molds and pressed to form shaped green ferrospinel bodies. The green bodies are fired at a temperature above the calcining temperature, generally at about 1000°–1400° C., to cause the oxides to react together to form a ferrospinel composition. The binder material is decomposed and volatilized during this process, usually during the warming-up period at a temperature considerably below the final firing temperature.

It has recently been found desirable to make relatively small ferrospinel bodies such as toroids having an outside diameter of about .060". Such small bodies molded from a mixture including a paraffin binder, or any other binder which has been previously used conventionally for this purpose, are relatively weak and subject to damage in handling. For example, many small toroids are broken upon being ejected from a mold and dropped a few inches into a tray. Small pellets made of these mixtures are also relatively weak and tend to become pulverized when vibrated in a feed hopper forming a powder that obstructs access to the mold into which they are being fed.

Accordingly, it is an object of the instant invention to provide an improved process for making ferrospinel bodies.

Another object is to provide an improved process for making ferrospinel bodies without the use of a water-borne binder.

Another object is to provide an improved process for making relatively small ferrospinel pellets.

Still another object is to provide an improved method of making green ferrospinel bodies.

These and other objects may be accomplished according to the instant invention by molding a green ferrospinel body of pellets comprising ferrospinel-forming oxides and a tacky, highly viscous organic binder. The binder may be introduced into the mixture by heating both it and the oxides to a temperature at which the binder becomes a free-flowing, non-viscous liquid, by diluting the binder in a solvent and mixing the resulting solution with the oxides, or by dry mixing in a Simpson mixer. The binder may be volatilized and driven off from the pressed bodies by heating before final firing in the conventional manner.

The following embodiment of the instant invention is preferred to produce relatively small ferrospinel bodies.

*Example I*

Raw ferrospinel-forming oxides are mixed together by grinding as in a hammer mill. The oxides are calcined at about 1000° C. for about one hour and cooled. The calcined product, which is somewhat sintered since the oxides at least partially react with each other during calcining, is ground by any convenient means such as a hammer mill or a wheel muller. As the grinding continues, the entire mill is heated to heat its contents to about 80° to 100° C. and a quantity of diethylene glycol ester of rosin equal to about 3% by weight of the calcined oxides is added. At this temperature the rosin ester is a free-flowing liquid and becomes thoroughly intermixed with the finely ground oxides. The milling is continued about one hour or until a relatively uniform mass is produced. This mass is pressed between steel rollers spaced about .003" to .005" apart which compact the material and reduce it to relatively hard flakes. The flakes are pulverized in a mill such as a ball mill to produce free-flowing, hard-surfaced pellets about 100 to 150 mesh in size.

Alternatively, pellets may be formed by the action of the mixing mill or a similar mill such as a ball or rod mill. The temperature of the mill may be reduced to room temperature, 20° to 40° C., and as the mill continues to operate it compacts the mixture into pellets of various sizes. The pellets may be withdrawn from the mill and classified to remove those of a desired size. The other pellets may be returned to the mill and the process repeated until substantially all the material is reduced to pellets of uniform size.

It is preferred to press the material as by rollers to form compacted flakes when it is desired to produce relatively small pellets to make relatively small ferrospinel bodies. The pressing between rollers provides relatively dense pellets, which are relatively strong and do not readily break up into fine powders even under severe treatment. As explained heretofore, it is desirable to avoid fine powders because they interfere with the flow of the pellets into a mold. When making relatively large pellets, however, such as 40 mesh and larger, sufficient strength is provided by other methods of pelletizing such as by ball milling as heretofore described. In either case, bodies molded of the pellets according to the invention have improved strength and are better able to withstand handling than bodies including previous, conventionally used binders.

Pellets about 100 to 150 mesh in size may be conveniently utilized to form relatively small shaped bodies such as the toroid heretofore described. Pellets produced according to the instant invention have a relatively hard surface and flow readily and pack relatively tightly into a mold. Molded bodies formed of the pellets are heated at about 250° to 300° C. for about 2–3 hours to decompose and to drive off the rosin ester. The bodies may then be heated to any desired final firing temperature such as 1000° to 1400° C.

Diethylene glycol ester of rosin is commercially available under the trade name of Flexalyn made by the Hercules Powder Company, Wilmington, Delaware. While this material is a preferred binder according to the invention, the invention is not limited thereto. Other volatilizable materials having similar physical properties may be substituted in its place. For example, linseed pitch or methyl ester of rosin may be utilized as a binder according to the instant invention. In general, any organic material is satisfactory which is highly viscous and tacky at ordinary room temperatures and is volatilizable at about 400° C. or lower. (It is generally desirable to remove the binder from a green ferrospinel body by volatilization before maturing the body in order to provide desirable electrical properties in the matured body.)

When the binder is mixed into the oxides in a ball or rod mill as heretofore described at elevated temperatures it is desirable that the oxides be raised to a temperature at which the binder becomes free-flowing and non-viscous and that this temperature be about 45° to 150° C. When using materials other than esterified rosin, some adjustment may have to be made in the temperatures at which they are mixed into the oxides. Generally any temperature at which the binder is a free-flowing, non-viscous liquid is satisfactory.

The amount of binder added to the oxides is not critical. Generally, satisfactory pellets may be formed from binder-oxide mixtures including about ½% to 8% by weight binder. Mixtures including about 2% to 3% binder are preferred and have been found to provide pellets having advantageous molding properties. Green ferrospinel bodies formed of these pellets have improved strength and resistance to breakage and chipping.

Alternatively, binders according to the invention may be mixed into an oxide mixture at room temperature instead of at elevated temperatures as heretofore described. The following method is preferred to produce relatively large ferrospinel bodies.

*Example II*

A calcined ferrospinel-forming oxide mixture is ground in a chaser mill such as a Simpson mixer to reduce it to a desired fine particle size. About 3% by weight of methyl ester of rosin is added to the mixture and the milling is continued for about one hour or until the rosin ester is thoroughly intermixed with the oxides.

The mixture may be pelletized by tumbling in a barrel, by milling in a ball or rod mill as heretofore described, or by any conventional means such as milling in a knife type hammer mill.

Pellets formed according to this embodiment of the invention are preferably about 40 mesh or larger in size. They are suitable for use in molding relatively large bodies such as those about ¼ inch in their smallest dimensions.

*Example III*

A third method of mixing binders according to the invention into a ferrospinel-forming oxide mixture comprises dissolving the binder in a suitable solvent such as acetone, xylene or methyl ethyl ketone.

A suitable mixture may be made by dissolving about 30 grams of diethylene glycol ester of rosin in about 1000 ml. of acetone. This solution may be mixed with about 1000 grams of oxides to form an oxide mixture including about 3% by weight rosin ester binder. The acetone may be volatilized by allowing the mixture to stand in a ventilated place, but may be driven off more rapidly by agitation.

The solvent method of introducing the binder is generally less satisfactory than the preferred method because of the relative cost of a suitable solvent. Acetone, for example, is relatively more expensive than the fuel required to heat the materials to the recommended temperatures. However, pellets and molded bodies made utilizing the solvent method mixture are in every way comparable with and as satisfactory as similar pellets and bodies made according to the preferred embodiment.

There have been described three general methods of mixing binders according to the invention into a ferrospinel-forming oxide mixture. These methods include (1) mixing at elevated temperatures in a ball or rod mill, (2) mixing at room temperature in a chaser mill such as a Simpson mixer, and (3) mixing by first dissolving the binder in a solvent.

Three novel methods of pelletizing the mixture have also been described. These include (1) milling the mixture in a ball or rod mill, (2) tumbling the mixture in a barrel, and (3) pressing the mixture between a pair of closely spaced rollers to produce flakes and grinding the flakes to produce fine pellets.

In general any of the methods of mixing the binder into the oxides may be utilized in conjunction with any method of pelletizing. Green bodies including a binder according to the invention are generally stronger than green bodies which include previously conventionally used binders. Green bodies made of pellets which have been produced by flaking are exceptionally strong and able to withstand relatively severe handling without damage.

What is claimed is:

1. A method of making a green ferrospinel body comprising the steps of mixing a quantity of ferrospinel-forming metallic oxides with ½% to 8% by weight of a binder consisting of an organic substance which is highly viscous and tacky at ordinary room temperatures and volatilizable at a temperature below about 400° C. selected from the group consisting of diethylene glycol esters of rosin and methyl esters of rosin, thereby to form an agglomerated mixture, comminuting said mixture, and molding said comminuted mixture into a shaped body.

2. The method according to claim 1 in which said binder is diethylene glycol ester of rosin.

3. The method according to claim 2 in which said binder is relatively free-flowing and non-viscous at about 45° to 150° C. and said mixing is carried out at 80° to 100° C.

4. The method according to claim 1 in which said oxides are mixed with 2% to 3% by weight of said binder.

5. The method according to claim 1 in which said binder is diethylene glycol ester of rosin, and said ester is diluted by dissolving it in a solvent.

6. The method according to claim 5 in which said solvent is a ketone and is present in the ratio of about 100 ml. solvent per 3 grams ester.

7. The method according to claim 1 in which said comminuting is accomplished by rolling said mixture between a pair of spaced rollers thereby to produce compressed flakes, and grinding said flakes.

8. A green ferrospinel body consisting essentially of intimately mixed metallic oxides and 0.5 to 8.0 percent by weight of an organic binder, said organic binder being a substance which is highly viscous at ordinary room temperatures and volatilizable at a temperature below about 400° C. selected from the group consisting of diethylene glycol esters of rosin and methyl esters of rosin.

9. A body according to claim 8 in which said binder is diethylene glycol ester of rosin.

10. A body according to claim 8 in which said binder is methyl ester of rosin.

11. A ferrospinel-forming composition of matter consisting essentially of intimately mixed metallic oxides and 0.5 to 8.0 percent by weight of an organic binder, said organic binder being a substance which is highly viscous at ordinary room temperatures, relatively free-flowing and non-viscous at about 45° to 150° C. and volatilizable at a temperature below about 400° C. selected from the group consisting of diethylene glycol esters of rosin and methyl esters of rosin.

References Cited in the file of this patent

UNITED STATES PATENTS

| | | |
|---|---|---|
| 2,064,773 | Vogt | Dec. 15, 1936 |
| 2,232,352 | Verweij et al. | Feb. 18, 1941 |
| 2,499,789 | Smelt | Mar. 7, 1950 |
| 2,565,861 | Leverenz et al. | Aug. 28, 1951 |
| 2,659,698 | Berge | Nov. 17, 1953 |

OTHER REFERENCES

Hercules "Synthetic Resins," pp. 3–7, 10 and 11, Rec'd January 1952.